3,723,139
ADDING ANTIMONY OXIDE-ANTIMONATE COMPOSITIONS TO RENDER POLYVINYL CHLORIDE COMPOSITIONS FLAME RETARDANT
William A. Larkin, Morristown, and John J. Kostrowski, Budd Lake, N.J., assignors to M & T Chemicals Inc., Greenwich, Conn.
No Drawing. Continuation-in-part of application Ser. No. 874,081, Nov. 4, 1969. This application Mar. 21, 1972, Ser. No. 236,761
Int. Cl. C09k 3/28
U.S. Cl. 260—45.75 R
14 Claims

ABSTRACT OF THE DISCLOSURE

This invention relates to an article of manufacture which is rendered resistant to burning and smoke formation by the addition of at least 1% by weight of a thermally unstable chlorine-containing material together with a flame retarding and smoke inhibiting amount of a composition comprising an unfused mixture of (1) 70% to 90% of an antimony oxide and (2) 10% to 30% of an antimonate selected from the group consisting of sodium antimonate, potassium antimonate, and magnesium antimonate and to the process for producing said article.

BACKGROUND

This invention is a continuation-in-part of application Ser. No. 874,081, filed Nov. 4, 1969, now abandoned.

This invention relates to novel compositions which impart flame retardancy together with minimal smoke evolution to normally flammable materials.

It is well known to employ the synergistic combination of antimony oxide with a halogen source as a flame retardant for a large variety of materials, including synthetic organic polymers and plastic materials derived from these polymers. While these compositions do effectively inhibit the propagation of flames, the amount of burning which does occur is accompanied by excessive amounts of smoke. The smoke may present more of a hazard than the actual fire, since in addition to being highly toxic the smoke would limit visibility and impede or prevent efforts to extinguish the fire. It has heretofore not been commercially feasible to prepare materials which exhibit the desirable combination of flame retardancy with minimal smoke evolution. Attempts to achieve this goal by combining antimony oxide with other materials have been at most only marginally successful. U.S. Pat. 3,560,441 discloses flame retardants which are prepared by the fusion of antimony oxide with a number of glass-forming oxides, including sodium antimonate. The solid material which is obtained upon cooling and grinding of the molten mixtures impart both flame-retardancy and transparency to poly(vinyl chloride) compositions, however the amount of smoke generated is not substantially reduced from that observed using antimony oxide alone.

It has now been found that the desired combination of flame retardancy with low smoke evolution can be achieved by using a halogen source together with simple mixtures of antimony oxide and sodium potassium or magnesium antimonate as flame retardants wherein the two components of the mixture are each present as discrete particles rather than as the fused solid solutions of the prior art.

SUMMARY OF THE INVENTION

The present invention provides an improved antimony oxide-containing flame retardant compositions which when used in combination with a chlorine source yields flame retardant articles exhibiting a minimal amount of smoke during combustion, the improvement comprising the presence of both antimony oxide and sodium, potassium or magnesium antimonate in an unfused state, the concentration of antimonate being between 10 and 30% by weight of the total oxide-antimonate composition. A preferred composition also contains between 5 and 15% by weight of magnesium oxide.

This invention also provides flame retardant articles that incorporate at least 1% by weight of an unstable chlorine-containing material wherein the flame retardant comprises an effective amount of an unfused mixture of antimony oxide and sodium, potassium or magnesium antimonate, the concentration of antimonate being between 10 and 30% by weight of said mixture.

This invention also provides a process for imparting flame retardancy and minimal smoke generation to a normally flammable composition containing at least 1% by weight of a thermally unstable chlorine-containing material, comprising adding to said combustible material a composition comprising a combination of (1) 70% to 90% by weight of an antimony oxide and (2) from 10% to 30% of an antimonate selected from the group consisting of sodium antimonate, potassium antimonate, and magnesium antimonate, preferably in combination with between 5% and 15% by weight of magnesium oxide.

DETAILED DESCRIPTION OF THIS INVENTION

Among the normally combustible materials which are rendered flame retardant in accordance with this invention are plastics in sheet form, in massive form, in powder form, etc. Typical of such plastics are vinyl-type polymers characterized as polymers and copolymers of vinyl chloride, vinylidene chloride, styrene, etc.; acrylic type polymers such as polymers and copolymers of ethyl acrylate, butyl acrylate, acrylonitrile, methyl methacrylate, acrylamide, etc.; polyolefin or related polymers such as polymers and copolymers of ethylene, propylene, isoprene, butadiene, etc.; condensation polymers, such as polyesters such as polyethylene terephthalate, polyethers characterized by polypropylene oxide, polyamides, polycarbonates, polyurethanes, epoxy resins, polyester styrene resins, etc. The combustible materials also include textiles formed from synthetic organic polymers, and cellulose type wood products such as paper or fabrics coated with plastic materials.

The novel process of this invention is particularly applicable to poly(vinyl chloride), in the form of flexible sheeting exhibiting a thickness of between 150 and .01 millimeters.

The thermally unstable chlorine-containing materials which find use in the practice of this invention are any one of those materials which decompose on heating to yield as one of the decomposition products hydrogen chloride, and may comprise a portion or all of the substrate to be flame retarded. These materials include poly (vinyl chloride), chlorinated paraffin waxes including 70% chlorinated paraffin wax (i.e., paraffin wax which has been chlorinated until it contains 70% by weight of chlorine), 40% chlorinated paraffin wax, chlorinated terephenyls, chlorinated rubber, etc. Typically, these chlorine-containing materials are used in amounts from at least 1% to 100% by weight of the polymeric organic plastic material to be rendered flame resistant. One of the preferred thermally unstable chlorine-containing materials are the chlorinated paraffin waxes. It will be understood that when the polymeric material which is rendered flame resistant also functions as the thermally unstable chlorine-containing material, e.g. poly(vinyl chloride), poly(vinylidene chloride), chlorinated polyester resins, etc., it is not necessary to add an additional amount of a thermally unstable chlorine-containing material.

Formulation of the novel flame retarding composition used in practice of the process of this invention is effected by blending 70% to 90% by weight of an antimony oxide, preferably antimony trioxide, $Sb_2O_3$, and 10% to 30% by weight of a compound selected from the group consisting of potassium antimonate, sodium antimonate, or magnesium antimonate. At no time are any of the components heated above their melting point.

Thus the novel smoke and flame proofing combination of this invention contains the following components:

TABLE I

| Component | Minimum | Maximum |
| --- | --- | --- |
| Antimony oxide | 70 | 90 |
| Antimonate | 10 | 30 |

A preferred composition used in the practice of this invention includes those containing 80% by weight of antimony trioxide $Sb_2O_3$ and 20% by weight of sodium antimonate $Na_2Sb_2O_7$.

It has also been found that the addition of about 10% by weight of magnesium oxide based upon the weight of the antimony oxide-antimonate composition results in a particularly effective flame retardant and low smoke forming composition.

Thus a preferred novel combination contains the following components:

TABLE II

| Component | Minimum | Maximum |
| --- | --- | --- |
| Antimony oxide | 60 | 80 |
| Antimonate | 15 | 25 |
| Magnesium oxide | 5 | 15 |

The antimony oxide-antimonate mixtures of this invention are employed at concentrations of between 1 and 55% based on the weight of the substrate to be flame retarded. Adequate levels of flame retardancy with minimal smoke evolution are obtained using between 1 and 12% by weight of the oxide-antimonate mixture. When the organic polymer employed is one which can function as the thermally unstable chlorine source, e.g. poly(vinyl chloride), poly(vinylidene chloride) or chlorinated polyester resins, it is usually unnecessary to add an additional thermally unstable chlorine-containing material.

When the organic polymer to be flame retarded is not one which functions as a thermally unstable source of chlorine, e.g. polyethylene or polystyrene a thermally unstable source of chlorine, e.g. chlorinated paraffin wax should be present in an amount of at least 1% and up to 12% by weight based upon the weight of the organic polymer. Preferably the thermally unstable chlorine source is present in an amount of 5.5% by weight of the organic polymer. The novel flame retardant and smoke proofing combination of this invention and the thermally unstable chlorine source are usually blended together before they are mixed with the polymeric material. Preferably, the flame retardant composition contains equal or nearly equal weights of chlorine-containing material and oxide-antimonate mixture, i.e., about 0.5–2.0 parts of the former per part of the latter.

The flame resistant plastic organic compositions of this invention can be formulated or blended by milling, i.e., Banbury blending, etc. The compositions obtained are then formed or molded by injection molding, extrusion, thermoforming, laminating, calendering, etc. The polymeric materials, e.g. low-density polyethylene, is added to a two roller, differential mill steam-heated to about 149° C. When the polymeric material becomes molten, a well-blended mixture of antimonate and 70% chlorinated paraffin wax is added uniformly to the molten mass, and the resulting composition milled for about five minutes. In order to obtain thorough mixing, the composition is removed from the mill and replaced several times. When the mixing is complete, the mill rolls are cooled and the flame resistant plastic composition removed. This composition is molded at 121° C. and a pressure of about 10,000 p.s.i. to form a flexible sheet from which samples may be cut for flame retardancy tests.

An unexpected advantage of this invention is that by employing specified proportions of sodium antimonate and antimony oxide one can achieve the excellent flame control of antimony oxide and the smoke control exhibited by pure sodium antimonate. A preferred mixture contains 80% by weight of antimony oxide and 20% of sodium antimonate. Between 1% and 12% by weight of this mixture is 20-mil poly(vinyl chloride) film imparts good to excellent smoke control with adequate flame retardation. It has been found that when the mixture also contains 5% to 10%, based on the combined weight of antimony oxide and sodium antimonate, of magnesium oxide the total cost of the flame retarding composition is substantially reduced with substantially no adverse effect on the control of both flame and smoke.

In order to clearly point out the novel features of this invention, illustrative compositions were prepared as disclosed in the following examples. In Examples 1–14 the flame retardant composition was added to a flexible poly(vinyl chloride) film as set forth in Table III.

TABLE III

| | Parts per hundred parts resin |
| --- | --- |
| Poly(vinyl chloride) resin | 100 |
| Di-octyl phthalate | 45 |
| Epoxydized soya bean oil | 5 |
| Stearic acid | 0.25 |
| Stabilizer-dibutyltin bis (isooctyl maleate) | 1.0 |
| Flame retardant as indicated | --- |

The above poly(vinyl chloride) film as set forth in Table III comprises a vinyl system plasticized with a dioctyl phthalate; heat stabilizers; plasticizers and lubricating agents.

The specific examples tabulated infra were prepared by the following procedure:

The poly(vinyl chloride) resin component was placed on a two-roller, steam-heated differential mill maintained at a temperature of 163° C. When the mass became molten, a well-blended mixture of the components to be added was added to the mill and the mixture was blended for an additional 1–2 minutes. The total milling time was 5 minutes.

The films obtained were then subjected to a flame spread and smoke evolution test specifically designed to measure the smoke evolution and flame spread of burning materials. This test was carried out using a modified S.P.I. flame test chamber. The smoke measuring assembly was directly attached to the top section of the unit. The assembly consists of a 3-inch diameter 18-inch long stainless steel hollow tube, one end fitted with a photoelectric cell and the opposite end a light source. The smoke was calculated according to the degree of reduction in light transmission along the smoke tube, by smoke drawn past the photo-cell by use of a variable speed exhaust fan. A change in light transmission was proportional to the amount of smoke evolved from the burning sample and was recorded on an integrator attached to the photo-cell unit. The flame spread was measured in length (inches) and correlated to the smoke evolved by the sample and may be calculated in smoke per inch of sample burned.

The percentage of the novel composition of this invention incorporated into the resin was varied in increments of 1%, 2%, 3%, 6%, and 10% of the total composition as is shown in the following tables.

TABLE IV

Smoke per 2.54 cm. of 0.125 mm. Vinyl Film Burned [1]

| Example | Weight percent of novel comp. | Percent antimony oxide | | | | | | | | | | |
|---|---|---|---|---|---|---|---|---|---|---|---|---|
| | | 100 | 90 | 80 | 70 | 60 | 50 | 40 | 30 | 20 | 10 | 0 |
| | | Percent sodium antimonate | | | | | | | | | | |
| | | 0 | 10 | 20 | 30 | 40 | 50 | 60 | 70 | 80 | 90 | 100 |
| 1 | 1 | 300 | 250 | 150 | 200 | 200 | 200 | 200 | 200 | 200 | 200 | 150 |
| 2 | 2 | 300 | 150 | 200 | 250 | 250 | 250 | 250 | 250 | 250 | 200 | 150 |
| 3 | 3 | 300 | 250 | 200 | 250 | 300 | 250 | 250 | 300 | 250 | 300 | 150 |
| 4 | 6 | 250 | 200 | 200 | 250 | 300 | 250 | 250 | 300 | 300 | 300 | 250 |
| 5 | 10 | 250 | 200 | 200 | 250 | 300 | 250 | 300 | 300 | 300 | 300 | 250 |
| 0.5 mm. Vinyl Film [2] | | | | | | | | | | | | |
| 6 | 1 | 1,200 | 1,100 | 1,200 | 900 | 1,100 | 900 | 900 | 900 | 1,000 | 1,000 | 900 |
| 7 | 2 | 1,200 | 1,100 | 1,000 | 1,100 | 1,000 | 1,100 | 900 | 900 | 1,000 | 1,000 | 1,000 |
| 8 | 3 | 1,200 | 1,100 | 1,000 | 1,000 | 1,100 | 900 | 1,200 | 900 | 900 | 900 | 900 |
| 9 | 6 | 900 | 1,000 | 1,000 | 1,000 | 1,100 | 900 | 1,100 | 900 | 900 | 1,000 | 900 |
| 10 | 10 | 900 | 900 | 900 | 900 | 1,000 | 900 | 900 | 1,000 | 1,000 | 900 | 900 |

[1] Smoke rating.—150–200-Excellent; 200–250-Good; 250–300-Fair; 300–350-Poor.
[2] Smoke rating.—900–1,000-Excellent; 1,000–1,100-Good; 1,100–1,200-Fair; 1,200–1,300-Poor.

TABLE V

Flame Spread Rating in Inches per Second [1]—0.125 mm. Vinyl Film [1]

| Example | Weight percent of novel comp. | Percent antimony oxide | | | | | | | | | | |
|---|---|---|---|---|---|---|---|---|---|---|---|---|
| | | 100 | 90 | 80 | 70 | 60 | 50 | 40 | 30 | 20 | 10 | 0 |
| | | Percent sodium antimonate | | | | | | | | | | |
| | | 0 | 10 | 20 | 30 | 40 | 50 | 60 | 70 | 80 | 90 | 100 |
| 11 | 1 | 1.75 | 2.25 | 2.25 | 2.25 | 2.25 | 2.25 | 2.25 | 2.25 | 2.25 | 2.25 | 2.25 |
| 12 | 2 | 1.75 | 2.00 | 1.75 | 1.75 | 2.00 | 2.00 | 2.00 | 2.25 | 2.25 | 2.25 | 2.25 |
| 13 | 3 | 1.50 | 1.75 | 1.75 | 1.75 | 1.75 | 2.25 | 2.00 | 2.00 | 2.25 | 2.25 | 2.25 |
| 14 | 6 | 1.50 | 1.50 | 1.50 | 1.50 | 1.50 | 1.50 | 1.50 | 1.50 | 1.50 | 1.75 | 2.00 |
| 15 | 10 | 1.50 | 1.50 | 1.50 | 1.50 | 1.50 | 1.50 | 1.50 | 1.50 | 1.50 | 1.50 | 1.50 |
| 0.5 mm Vinyl Film | | | | | | | | | | | | |
| 16 | 1 | 1.50 | 1.75 | 1.50 | 1.75 | 1.75 | 1.75 | 2.00 | 2.25 | 2.00 | 2.25 | 2.25 |
| 17 | 2 | 1.50 | 1.50 | 1.50 | 1.50 | 1.50 | 1.50 | 1.75 | 2.00 | 1.75 | 2.00 | 2.25 |
| 18 | 3 | 1.50 | 1.50 | 1.50 | 1.50 | 1.50 | 1.75 | 1.50 | 1.75 | 1.75 | 1.75 | 1.75 |
| 19 | 6 | 1.50 | 1.50 | 1.50 | 1.50 | 1.50 | 1.50 | 1.50 | 1.50 | 1.50 | 1.50 | 1.50 |
| 20 | 10 | 1.50 | 1.50 | 1.50 | 1.50 | 1.50 | 1.50 | 1.50 | 1.50 | 1.50 | 1.50 | 1.50 |

[1] Flame spread ratings.—1.50–1.75=Excellent; 1.75–2.00=Good; 2.00–2.25=Fair; 2.25–2.50=Poor.

It will be noted that an unexpected decrease in smoke evolution occurs when the sodium antimonate comprises between 10 and 30% by weight of the antimony trioxide-sodium antimonate mixture.

Examples 11 through 14 illustrate the effectiveness of the composition of this invention when 10 parts by weight of magnesium oxide were added to a composition comprising 80 parts by weight of antimony trioxide and 20 parts by weight of sodium antimonate. The compositions were prepared and tested in a manner identical with those of Example 1 through 10. The following table illustrates the effectiveness of this composition. The flexible vinyl films prepared were each 0.5 millimeter in thickness.

TABLE VI

| Example No. | Flame retardant, percent | Smoke value |
|---|---|---|
| 11 | 2 | 763 |
| | | 718 |
| | | 797 |
| 12 | 3 | 600 |
| | | 628 |
| | | 904 |
| 13 | 6 | 638 |
| | | 600 |
| | | 757 |
| 14 | 10 | 722 |
| | | 753 |
| | | 639 |

From Examples 1 through 10 in Table IV in which the compositions of this invention were subjected to smoke evolution test as set forth above, it may readily be seen that while antimony oxide used alone only gave poor ratings with increased concentrations of antimony oxide, deviations from the critical ratio is deleterious to the practice of this invention. While other blends indicate reduced flame spread, which is a critical property, the smoke evolution is such that it is of little value for use in this invention. From Examples 11 through 20 in Table V which evaluate the flame spread for the same series of materials, sodium antimonate alone gives the poorest ratings until a 10% concentration may be reached, at which point flame retardance becomes excellent. As may be seen from the above tables, increased concentrations of sodium antimonate increase the flame spread, which is undesirable, but do not necessarily decrease the smoke values. Only in the practice of this invention are optimum results in flame retardance and smoke inhibition obtained.

In order to differentiate between the performance of the present compositions and poly(vinyl chloride) containing a fused solid solution of antimony trioxide and sodium antimonate as described in U.S. Pat. 3,560,441, three 15 mil-thick films were prepared, each of which exhibited the following composition, expressed in parts by weight.

| | Parts |
|---|---|
| Poly(vinyl chloride) resin | 100 |
| Dioctyl phthalate | 45 |
| Epoxidized soy bean oil | 5 |
| Heat stabilizer [1] | 2.5 |
| Stearic acid | 0.5 |
| Flame retardant (as specified) | 3 |

[1] A commercially available mixture of barium and cadmium salts of fatty acids.

The four test samples each contained one of the following flame retardants:

(1) An 80:20 weight mixture of antimony trioxide: sodium antimonate, which had previously been fused, then reduced to a particle size smaller than about 325 mesh.

(2) An unfused 80:20 weight ratio mixture of antimony trioxide:sodium antimonate.

(3) An unfused 80:20:10 weight ratio mixture of antimony trioxide:sodium antimonate:magnesium oxide.

The following results were obtained for the flame spread and smoke evolution tests:

| Sample No. | Flame spread [1] (inches/ seconds) | Smoke/ inch of sample burned [1] |
|---|---|---|
| 1 (prior art) | 1.7 | 1,444 |
| 2 | 1.7 | 1,334 |
| 3 | 2.0 | 1,032 |

[1] Average of five trials.

The above data demonstrate significantly reduced smoke evolution for the samples containing an unfused mixture of antimony trioxide and sodium antimonate when compared with a mixture containing these materials in a fused state. The amount of smoke evolved is further reduced by the addition of magnesium oxide.

Although this invention has been illustrated by reference to specific embodiments, modifications thereof which are within the scope of the invention will be apparent to those skilled in the art.

What is claimed is:

1. A method for imparting the properties of flame retardancy and minimal smoke generation to a normally flammable material consisting essentially of polyvinyl chloride, said method consisting essentially of treating the flammable material with an unfused mixture consisting of from 70 to 90% of an antimony oxide and from 10 to 30% of an antimonate selected from the group consisting of sodium antimonate, potassium, antimonate, and magnesium antimonate, said mixture comprising between about 1 and 55% of the weight of said flammable material.

2. The method of claim 1 wherein said antimonate is sodium antimonate.

3. The method of claim 1 wherein the concentration of the oxide-antimonate mixture is between 1% and 10%, based on the weight of poly(vinyl chloride).

4. The method of claim 1 wherein said mixture consists of from 60% to 80% of (1) an antimony oxide and from 15% to 25% of (2) an antimonate selected from the group consisting of sodium antimonate, potassium antimonate, and magnesium antimonate, and 5% to 15% of (3) magnesium oxide.

5. The method of claim 4 wherein said antimonate is sodium antimonate and the concentration of the oxide-antimonate mixture is between 1% and 10% by weight of said flammable material.

6. A flame retardant and non-smoke generating composition consisting essentially of polyvinyl chloride, said composition having incorporated therein an unfused mixture consisting of from 70% to 90% of an antimony oxide and from 10% to 30% of an antimonate selected from the group consisting of sodium antimonate, potassium antimonate, and magnesium antimonate, said mixture comprising between about 10% and 55% by weight of the total composition.

7. The composition of claim 6 wherein said antimonate is sodium antimonate.

8. The composition of claim 6 wherein the concentration of the oxide-antimonate mixture is between 1% and 10% by weight of said poly(vinyl chloride).

9. The flame retardant composition of claim 6 wherein said flame retarding and smoking inhibiting composition consists essentially of a mixture consisting of from 60% to 80% of (1) an antimony oxide and from 15% to 25% of (2) an antimonate selected from the group consisting of sodium antimonate, potassium antimonate, and magnesium antimonate, and 5% to 15% of (3) magnesium oxide.

10. The flame retardant composition of claim 9 wherein said antimonate is sodium antimonate.

11. A normally flammable article of manufacture characterized by its resistance to burning and by minimal smoke generation, said article consisting essentially of polyvinyl chloride, said article having incorporated therein between about 1% and 12% by weight, based on said article of an unfused mixture consisting of from 70% to 90% of an antimony oxide and from 10% to 30% of an antimonate selected from the group consisting of sodium antimonate, potassium antimonate, and magnesium antimonate, said mixture comprising between about 1% and 55% by weight of the total article.

12. The article of claim 11 wherein said antimonate is sodium antimonate.

13. The article of claim 11 wherein the concentration of the oxide-antimonate mixture is between 1% and 10% by weight, based on said poly(vinyl chloride).

14. The normally flammable article of claim 11, said article having incorporated therein between 5% and 15%, based on said mixture of magnesium oxide.

References Cited

UNITED STATES PATENTS

| | | | |
|---|---|---|---|
| 3,034,939 | 5/1962 | Newkirk et al. | 106—15 FP |
| 3,121,067 | 2/1964 | Nelson | 260—41 |
| 3,151,992 | 10/1964 | Blair et al. | 106—15 FP |
| 3,158,588 | 11/1964 | Johnson | 106—15 FP X |
| 3,313,763 | 4/1967 | Creighton et al. | 106—15 FP X |
| 3,458,327 | 7/1969 | Fraser | 106—15 FP X |
| 3,560,441 | 2/1971 | Schwarcz | 106—15 FP X |

DONALD J. ARNOLD, Primary Examiner

D. A. JACKSON, Assistant Examiner

U.S. Cl. X.R.

260—45.7; 252—8.1; 106—15 FP